United States Patent
Bonsignore et al.

(10) Patent No.: US 12,416,852 B2
(45) Date of Patent: Sep. 16, 2025

(54) METHOD FOR ALIGNMENT OF OPTICAL COMPONENTS OF A PROJECTOR

(71) Applicant: TRINAMIX GMBH, Ludwigshafen am Rhein (DE)

(72) Inventors: Christian Bonsignore, Ludwigshafen am Rhein (DE); Peter Fejes, Ludwigshafen am Rhein (DE); Jan David Alexander Koloczek, Ludwigshafen am Rhein (DE); Benjamin Rein, Weinheim (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 18/688,819

(22) PCT Filed: Oct. 5, 2022

(86) PCT No.: PCT/EP2022/077663
§ 371 (c)(1),
(2) Date: Mar. 4, 2024

(87) PCT Pub. No.: WO2023/057495
PCT Pub. Date: Apr. 13, 2023

(65) Prior Publication Data
US 2025/0123543 A1 Apr. 17, 2025

(30) Foreign Application Priority Data
Oct. 6, 2021 (EP) .................................. 21201291

(51) Int. Cl.
*H04N 9/31* (2006.01)
*G01B 11/25* (2006.01)
*G03B 21/14* (2006.01)

(52) U.S. Cl.
CPC ........ *G03B 21/142* (2013.01); *G01B 11/2504* (2013.01)

(58) Field of Classification Search
CPC ........ H04N 9/3129; H04N 9/31; H04N 9/315; H04N 9/317; G03B 21/142; G03B 21/14; G01B 11/2504
(Continued)

(56) References Cited

U.S. PATENT DOCUMENTS

2009/0153749 A1* 6/2009 Mixon ................. H04N 9/3182
                                                                          348/744
2015/0124225 A1   5/2015 Akiyama
2023/0410463 A1* 12/2023 Zhou .................... G06V 10/143

FOREIGN PATENT DOCUMENTS

WO   2017222618 A1   12/2017
WO   2018091638 A1    5/2018
(Continued)

OTHER PUBLICATIONS

Jiang et al., Dreidimensionales Computersehen, Springer, Berlin Heidelberg, pp. 7-37 (1997).
(Continued)

*Primary Examiner* — Sherrie Hsia
(74) *Attorney, Agent, or Firm* — Armstrong Teasdale LLP

(57) ABSTRACT

Disclosed herein is a method for alignment of optical components of a projector for illuminating at least one object with at least one illumination pattern including a plurality of illumination features. The projector includes at least one array of emitters. Each of the emitters is configured for generating at least one light beam. The projector includes at least one transfer device configured for generating the illumination features from the light beams impinging on the transfer device.

15 Claims, 4 Drawing Sheets

(58) Field of Classification Search
USPC .............. 348/744–747, 756, 779, 781, 806
See application file for complete search history.

(56) References Cited

FOREIGN PATENT DOCUMENTS

| WO | 2018091649 A1 | 5/2018 |
| WO | 2019091640 A2 | 5/2018 |
| WO | 2019042956 A1 | 3/2019 |
| WO | 2021069400 A1 | 4/2021 |

OTHER PUBLICATIONS

Lennartz et al., "Whitepaper—Beam Profile Analysis for 3D Imaging and Material Detection", pp. 1-7 (2021).
"Vertical-cavity surface-emitting laser", accessed on May 30, 2024 https://en.wikipedia.org/wiki/Vertical-cavity_surface-emitting_laser.
Chandrappan et al., "Performance Characterization Methods for Optoelectronic Circuit Boards", IEEE Transaction on Components, Packaging and Manufacturing Technology, vol. 1, No. 3, pp. 318-326 (2011).
International Search Report for PCT/EP2022/077663 mailed Jan. 19, 2023, 3 pages.
Written Opinion for PCT/EP2022/077663 mailed Jan. 19, 2023, 7 pages.

* cited by examiner

METHOD FOR ALIGNMENT OF OPTICAL COMPONENTS OF A PROJECTOR

CROSS-REFERENCE TO RELATED APPLICATIONS

This application is a U.S. National Phase Application of International Patent Application No. PCT/EP22/77663, filed Oct. 5, 2022, which claims priority to EP patent application Ser. No. 21/201,291.8 filed Oct. 6, 2021, each of which is hereby incorporated by reference herein.

FIELD OF THE INVENTION

The invention relates to a method for alignment of optical components of a projector for illuminating at least one object with at least one illumination pattern, a detector, a mobile device, and several uses. The devices, methods and uses according to the present invention specifically may be employed for example in various areas of daily life, gaming, traffic technology, production technology, security technology, photography such as digital photography or video photography for arts, documentation or technical purposes, medical technology, home care, smart living or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

The present invention relates to depth measurement using beam profile analysis (BPA), also de-noted as depth-from-photon-ratio technique (DPR). With respect to BPA reference is made to WO 2018/091649 A1, WO 2018/091638 A1, WO 2018/091640 A1 and C. Lennartz, F. Schick, S. Metz, "Whitepaper-Beam Profile Analysis for 3D imaging and material detection" Apr. 28, 2021, Ludwigshafen, Germany, the full content of which is included by reference. The BPA can be combined with structured light techniques, e.g. as described in WO 2019/042956. Typically, in these devices and methods a point pattern is projected and the reflected pattern is recorded and evaluated. The pattern, for example, is generated by using at least one array of emitters such as vertical-cavity surface-emitting lasers (VCSELs).

Optical 3D imaging systems may comprise a camera and a projector, in particular a laser projector. In case of structured light type systems (also common for active stereo based systems) the laser projector projects a dot pattern in the environment. Especially for VCSEL-Array based laser projectors it is common that these consist of two main components, the VCSEL-Array and a refractive optical lens stack. Alignment of these two components is crucial for the performance of the projector. If the alignment is not properly done, the projected dot pattern could suffer from different aberrations like a distorted dot pattern, distorted dots or an inhomogeneous dot intensity distribution.

The alignment of the VCSEL-array and the refractive optical lens stack is commonly done in an active alignment process with the help of an auxiliary camera and a transparent target plate. In this active alignment process the VCSEL-array is mechanically aligned to the target and the camera, so that the optical center point of the VCSEL-array is only determined in an indirect way. This could lead to distortions in the dot pattern. For structured light based systems, this is not a problem because the pattern has an intrinsic distortion and only distortions on a smaller scale within the repeating structures are important. However, those distortion have a negative impact on the performance of 3D technologies that rely on known regular grid structures.

VCSEL-array based laser dot projectors with a refractive optical lens stack may exhibit pattern distortions and optical propagation deviations, originating in the imperfect alignment of the lens stack to the VCSEL-array. In addition to the distortion of the overall pattern shape, inhomogeneous size- and power density-distributions of the projected dots can be the result. All of these aberrations can be problematic for 3D sensing solutions which rely on non-random, grid-structured spot patterns and should therefore be minimized.

The degrees of freedom for this misalignment between the two components may comprise translation perpendicular to the optical axis and any angular tilt away from the optical axis, (perpendicular to the VCSEL-array. Between those two error sources, there is an interdependence when looking at the projected pattern, e.g., the optical propagation tilt introduced by a translational error can be compensated by deliberately tilting the refractive optical lens stack. However, this results in a more pronounced (for example, trapezoidal) pattern distortion. Such an approach should therefore be avoided.

US 2015/124225 A1 describes a light source device including a plurality of light sources arranged in a first direction, a first cylindrical lens, which light beams from the plurality of light sources enter, and a lens unit, which light beams from the first cylindrical lens enter. A generating line of the first cylindrical lens is parallel to the first direction. The lens unit is provided with a plurality of cylindrical lenses disposed so as to correspond respectively to the plurality of light sources, and a generating line of each of the plurality of cylindrical lenses intersects with the first direction. An arrangement of a second cylindrical lens included in the plurality of the cylindrical lenses is determined independently of the adjacent one of the cylindrical lenses.

Jayakrishnan Chandrappan et al. "Performance Characterization Methods for Optoelectronic Circuit Boards", IEEE TRANSACTIONS ON COMPONENTS, PACKAGING AND MANUFACTURING TECHNOLOGY, IEEE, USA, vol. 1, no. 3, 2011 Mar. 1, pages 318-326, XP011352439, ISSN: 2156-3950, DOI: 10.1109/TCPMT.2010.2100654 describes performance evaluation methods for bidirectional optoelectronic circuit boards (OECBs) operating at 10 Gb/s. A typical OECB consists of flip chip surface mount optical transceiver modules and polymer optical interconnects. The evaluation techniques include direct current and high-speed optical characterizations of individual components, subsystems, and interconnect. A methodical procedure to validate optical waveguide, vertical cavity surface emitting laser, photodiode, high-speed optical characterization of transmitter, receiver, and optical link is described.

WO 2021/069400 A1 describes a projector for illuminating at least one object with at least one illumination pattern. The projector comprises at least one array of vertical-cavity surface-emitting lasers (VCSELs). Each of the VCSELs is configured for generating at least one light beam. The projector comprises at least one optical system configured for generating a characteristic beam profile for each of the light beams generated by the VCSELs of the array. The beam profile of neighboring VCSELs of the array differs in lateral and/or axial direction such that light beams of the VCSELs of the array are assignable to the corresponding VCSEL in three-dimensional space.

Problem Addressed by the Invention

It is therefore an object of the present invention to provide devices and methods facing the above-mentioned technical challenges of known devices and methods. Specifically, it is an object of the present invention to provide devices and methods which allow minimizing of both named error sources to obtain a projected pattern with minimal distortion, which propagates perpendicularly from an emitter array, and with best possible homogeneity of the projected spots.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

In a first aspect of the present invention a method for alignment of optical components of a projector for illuminating at least one object with at least one illumination pattern comprising a plurality of illumination features is disclosed. The projector comprises at least one array of emitters. Each of the emitters is configured for generating at least one light beam. The projector comprises at least one transfer device configured for generating the illumination features from the light beams impinging on the transfer device.

The method steps may be performed in the given order or may be performed in a different order. Further, one or more additional method steps may be present which are not listed. Further, one, more than one or even all of the method steps may be performed repeatedly.

The method comprises the following steps:
a) at least one emitter array alignment step, comprising generating a light beam by each of the emitters and illuminating a surface of the object with the light beams without the transfer device between the array of emitters and the object thereby generating a spot on the object, imaging at least one image of the spot by using at least one camera, determining at least one intensity distribution of the spot by evaluating the image of the spot and comparing the determined intensity distribution to at least one pre-defined and/or pre-known intensity distribution using at least one evaluation device, adapting an orientation of the array of emitters such that a central axis of the array of the emitters is perpendicular to the surface of the object in case a deviation of the determined intensity distribution and the pre-defined and/or pre-known intensity distribution exceeds at least one tolerance range;
b) at least one transfer device alignment step comprising
b1) marking a center position of the spot on the object, arranging the transfer device between the array of emitters and the object such that an optical axis of the transfer device is perpendicular to the surface of the object,
generating a light beam by each of the emitters, illuminating the surface of the object with the light beams with the transfer device between the array of emitters and the object thereby generating the illumination pattern on the object,
imaging at least one image of the object illuminated by the illumination pattern by using the camera,
evaluating the image of the object thereby determining a center of the illumination pattern on the object using the evaluation device,
comparing the determined center and the marked center position,
adapting a position of the center to the marked center position by translating the array of emitters in regard to the transfer device in case a deviation of the center and the marked center position exceeds at least one tolerance range,
and/or
b2) arranging the transfer device between the array of emitters and the object,
generating a light beam by each of the emitters, illuminating the surface of the object with the light beams with the transfer device between the array of emitters and the object thereby generating the illumination pattern on the object,
imaging at least one image of the object illuminated by the illumination pattern by using the camera,
evaluating the image of the object thereby determining a bounding box of the illumination pattern by using the evaluation device,
comparing at least one property of the determined bounding box to at least one pre-defined and/or pre-known property of a target bounding box and
adapting a position and/or orientation of the transfer device in case a deviation of the property of the determined bounding box and the pre-defined and/or pre-known property exceeds at least one tolerance range.

The method according to the present invention does not only consider the optical propagation axis, but also pattern distortion. This may allow minimizing error sources.

As used herein, the term "alignment" may refer to a process of adjusting relative position and/or orientation of optical components of the projector, in particular of the array of emitters and the transfer device. The alignment may comprise minimizing distortion of the illumination pattern.

As used herein, the term "projector", also denoted as light projector, may refer to an optical device configured for generating and projecting the at least one illumination pattern onto the object, specifically onto a surface of the object. The projector comprises the array of emitters and the transfer device as optical components. The projector may comprise additional optical components. As used herein, the term "optical component" may refer to any arbitrary optical element of the projector such as light emitter, at least one lens, at least one mirror and the like.

As used herein, the term "pattern" may refer to an arbitrary known or pre-determined arrangement comprising a plurality of arbitrarily shaped features such as symbols. The pattern may comprise a plurality of features. The pattern may comprise an arrangement of periodic or non-periodic features. As used herein, the term "at least one illumination pattern" may refer to at least one arbitrary pattern comprising the illumination features adapted to illuminate at least one part of the object.

As used herein, the term "illumination feature" refers to at least one at least partially extended feature of the pattern. The illumination pattern comprises a plurality of illumination features. The illumination pattern may be selected from the group consisting of: at least one point pattern; at least one line pattern; at least one stripe pattern; at least one checkerboard pattern; at least one pattern comprising an arrangement of periodic or non periodic features. The illumination pattern may comprise regular and/or constant and/or periodic pattern such as a triangular pattern, a rectangular pattern, a hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic or non-periodic feature; at least one arbitrary shaped featured. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the projector may be configured for generate and/or to project a cloud of points or non-point-like features. For example, the projector may be configured for generate a cloud of points or non-point-like features such that the illumination pattern may comprise a plurality of point features or non-point-like features. The illumination pattern may comprise regular and/or constant and/or periodic patterns such as a triangular pattern, a rectangular pattern, a hexagonal pattern, or a pattern comprising further convex tilings. The illumination pattern may comprise as many features per area as possible such that a hexagonal pattern may be preferred. A distance between two features of the respective illumination pattern and/or an area of the at least one illumination feature may depend on a circle of confusion in an image determined by at least one detector. For example, illumination pattern may comprise a periodic point pattern.

As further used herein, the term "illuminating with at least one illumination pattern" refers to providing the at least one illumination pattern for illuminating the at least one object. As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam specifically may be a Gaussian light beam or a linear combination of Gaussian light beams, as will be outlined in further detail below. Other embodiments are feasible, however.

As used herein, the term "emitter" may refer to at least one arbitrary device configured for providing the at least one light beam for illumination of the object. Each of the emitters may be and/or may comprise at least one element selected from the group consisting of at least one laser source such as at least one semi-conductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser (VCSEL), in particular at least one VCSEL-array; at least one non-laser light source such as at least one LED or at least one light bulb.

The array of emitters may be a two-dimensional or one dimensional array. The array may comprise a plurality of emitters arranged in a matrix. As further used herein, the term "matrix" generally may refer to an arrangement of a plurality of elements in a predetermined geometrical order. The matrix specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point.

For example, the emitters may be an array of VCSELs. As used herein, the term "vertical-cavity surface-emitting laser" refers to a semiconductor laser diode configured for laser beam emission perpendicular with respect to a top surface. Examples for VCSELs can be found e.g. in en.wikipedia.org/wiki/Vertical-cavity_surface-emitting_laser. VCSELs are generally known to the skilled person such as from WO 2017/222618 A. Each of the VCSELs is configured for generating at least one light beam. The VCSELs may be arranged on a common substrate or on different substrates. The array may comprise up to 2500 VCSELs. For example, the array may comprise 38×25 VCSELs, such as a high power array with 3.5 W. For example, the array may comprise 10×27 VCSELs with 2.5 W. For example, the array may comprise 96 VCSELs with 0.9 W. A size of the array, e.g. of 2500 elements, may be up to 2 mm×2 mm.

The light beam emitted by the respective emitter may have a wavelength of 300 to 1100 nm, preferably 500 to 1100 nm. For example, the light beam may have a wavelength of 940 nm. For example, light in the infrared spectral range may be used, such as in the range of 780 nm to 3.0 µm. Specifically, the light in the part of the near infrared region where silicon photodiodes are applicable specifically in the range of 700 nm to 1100 nm may be used. The emitters may be configured for generating the at least one illumination pattern in the infrared region, in particular in the near infrared region. Using light in the near infrared region may allow that light is not or only weakly detected by human eyes and is still detectable by silicon sensors, in particular standard silicon sensors. For example, the emitters may be an array of VCSELs. The VCSELs may be configured for emitting light beams at a wavelength range from 800 to 1000 nm. For example, the VCSELs may be configured for emitting light beams at 808 nm, 850 nm, 940 nm, or 980 nm. Preferably the VCSELs emit light at 940 nm, since terrestrial sun radiation has a local minimum in irradiance at this wavelength, e.g. as described in CIE 085-1989 "Solar spectral Irradiance".

The projector comprises the transfer device configured for generating the illumination features from the light beams impinging on the transfer device. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may comprise at least one imaging optical device. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system; at least one holographic optical element; at least one meta optical element. Specifically, the transfer device comprises at least one refractive optical lens stack. Thus, the transfer device may comprise a multi-lens system having refractive properties.

The emitter array alignment step may comprise, in a first step, using the array of emitters without the transfer device. Step a) may comprise removing the transfer device from the projector. In this configuration the array of emitters may produce only one big spot which is imaged by the at least one camera. As used herein, the term "spot", also denoted as "light spot", generally refers to a visible or detectable round or non-round illumination of the object by at least one light beam.

The method according to the present invention may be an active alignment process. Therefore at least one camera is used in steps a) and b), e.g. for imaging the illumination pattern during the alignment process. As used herein, the term "camera" may refer to a device having at least one imaging element configured for recording or capturing spatially resolved one-dimensional, two-dimensional or even three-dimensional optical data or information. As an example, the camera may comprise at least one camera chip, such as at least one CCD chip and/or at least one CMOS chip configured for recording images. As used herein, without limitation, the term "image" specifically may relate to data recorded by using a camera, such as a plurality of electronic readings from the imaging device, such as the pixels of the camera chip.

The object used for the method may be at least one target screen. As used herein, the term "target screen" may refer to a projection screen having a planar surface configured for displaying a projected light beam. For example, the target screen is at least one semi-transparent target screen. The semi-transparent target screen may permit light, in particular of a certain wavelength range, impinging on the target screen at least partially to pass. For example, the semi-transparent target screen may allow at least 30% of the light to pass. The projector may be arranged on one side of the target screen and the camera is arranged on an opposite side of the target screen. In this example, the optical setup may comprise two cameras. A first camera may be a camera of a detector according to the present invention used for 3D sensing. A second camera, also denoted as auxiliary camera, may be used for the method for alignment. The auxiliary camera may be combined with the semi-transparent screen with the projector on the opposite side of the screen. Alternatively, a non-transparent screen and the camera of the 3D imaging system can be used. The object may be a non-transparent target screen. The projector and the camera may be arranged on the same side of the target screen.

The array of emitters may comprise the so-called central axis of the array of emitters, i.e. an axis perpendicular to the surface of the emitters going through the center of the array. The central axis of the array of emitters may be parallel to, in particular coincides with, an axis perpendicular to the surface of the target screen, in case the array of emitters is properly aligned. "Properly aligned" may refer to that the central axis of the array of emitters is parallel to, in particular coincides with, the axis perpendicular to the surface of the target screen at least within tolerance. Otherwise, the light beams generated by the emitters may propagate tilted with respect to the axis perpendicular to the surface of the target screen, e.g. including an angle with the axis. As an example, in case of proper alignment of the array of emitters, the light beams and the axis perpendicular to the surface of the target screen may include an angle of less than 10°, preferably less than 5° or even less than 2°. Other embodiments, however, are feasible.

The spot may be used to align the central axis of the array of emitters to be perpendicular to the target screen. In case the central axis of the array of emitters is not perpendicular to the target screen, the spot is distorted. The spot may comprise an intensity distribution in the plane of the surface of the target screen. This plane may also be denoted the xy-plane. A direction perpendicular to the plane may be denoted as z-direction. The intensity distribution may have a centroid. In case of proper alignment of the array of emitters, the centroid may be at its target position. The target position may coincide with the center point of the spot. However, in case the array of emitters is tilted, the centroid of the spot shifts away from its target position. The evaluation device is configured for determining the intensity distribution of the spot by evaluating the image of the spot. As used herein, the term "intensity distribution" may refer to a one or two dimensional intensity distribution.

The term "evaluation device" generally may refer to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations. Operations, including evaluating the images. Thus, as an example, one or more instructions may be implemented in software and/or hardware. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation. Additionally or alternatively, however, the evaluation device may also fully or partially be embodied by hardware.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as Camera-Link. The evaluation device and/or the data processing device may further be connected by one or more of interprocessor interfaces or ports, FPGA-FPGA-interfaces, or serial or parallel interfaces ports. The evaluation device and the data processing device may further be connected to one or more of an optical disc drive, a CD-RW drive, a DVD+ RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

The evaluation device may be configured for performing at least one image analysis and/or image processing in order to identify the spot. The image analysis and/or image processing may use at least one feature, in particular spot, detection algorithm.

The evaluation device may be configured for determining the one or two dimensional intensity distribution from the image of the spot, in particular by evaluating intensity values of the pixels of the camera. The evaluation device may be configured for determining a centroid of the intensity distribution.

The method comprises comparing the determined intensity distribution to at least one pre-defined and/or pre-known intensity distribution by using the evaluation device. The term "pre-defined and/or pre-known intensity distribution" may refer to a complete intensity distribution such as intensity as a function of at least one of x and y and/or to at least one property characterizing the intensity distribution such as the target position of the centroid. The pre-defined and/or pre-known intensity distribution may be an intensity distribution and/or the target position of the centroid of the intensity distribution of a properly aligned array of emitters. The pre-defined and/or pre-known intensity distribution may be stored in at least one database of the evaluation device. For example, the target position of the centroid of the intensity distribution of the properly aligned array of emitters is compared to the centroid of the imaged intensity distribution. In case a deviation of the determined intensity distribution and the pre-defined and/or pre-known intensity distribution exceeds at least one tolerance range, the method comprises adapting an orientation of the array of emitters such as mechanically by changing a tilt angle, in particular tilting the array of emitters. Otherwise, i.e. in case the deviation of the determined intensity distribution and the pre-defined and/or pre-known intensity distribution is within the at least one tolerance range, the method may proceed with step b). The tolerance range may be ±10%, preferably ±5%, more preferably ±2%.

In step b1), after the array of emitters is properly aligned, the center position of the spot is marked. The marking may comprise applying at least one marker to the center position such as at least one highlighting, at least one cross, or the like. The marking may be performed manually or automatically.

The transfer device is arranged between the array of emitters and the object. The transfer device may be put on top of the array of the emitters so that the illumination pattern becomes visible. The optical axis of the transfer device may be pre-known and may be aligned perpendicular to the target screen, e.g. mechanically.

In a next step, the center of the illumination pattern, also denoted the 0th-order, may be aligned to the center position of the spot of step a). Each of the emitters generates a light beam and the surface of the object is illuminated with the light beams with the transfer device between the array of emitters and the object thereby generating the illumination pattern on the object. The camera, e.g. the at least one auxiliary camera described with respect to step a) or the camera of the detector, images the at least one image of the object illuminated by the illumination pattern. The evaluation device is configured for evaluating the image of the object thereby determining the center of the illumination pattern. The evaluation device is configured for comparing the determined center and the marked center position. In case a deviation of the center and the marked center position exceeds at least one tolerance range the position of the center is adapted to the marked center position by translating the array of emitters in regard to the transfer device. The tolerance range may be ±10%, preferably ±5%, more preferably ±2%. In case the tolerance range is not exceeded, the position of the center may be maintained.

Additionally or alternatively, the transfer device alignment step comprises step b2). The combination of b1) and b2) may allow obtaining the best possible alignment. However, e.g. for time saving, the method may only comprise one of b1) or b2).

Step b2) may begin with arranging the transfer device between the array of emitters and the object. Step b2) comprises generating a light beam by each of the emitters, illuminating the surface of the object with the light beams with the transfer device between the array of emitters and the object thereby generating the illumination pattern on the object and imaging at least one image of the object illuminated by the illumination pattern by using the camera, e.g. the at least one auxiliary camera described with respect to step a) or the camera of the detector.

For example, the transfer device in front of the array of emitters may create a projection of the illumination pattern, e.g. a regular spot pattern, on the target screen. Misalignment of the corresponding axes, i.e. the transfer device is shifted and/or tilted in front of the array of emitters, may lead to a deformed pattern. Therefore, the dots, and their respective positions to each other can be used to determine the alignment quality.

The method step b2) comprises evaluating the image of the object. The evaluation device may be configured for identifying illumination features on the image of the object illuminated by the illumination pattern and for determining their respective spot positions and/or grid positions. The evaluation may comprise determining the positions of the illumination features and their respective grid position in the image of the camera. The grid position may be a position of the illumination feature within the pattern. The evaluation device may comprise software tools for determining the spot positions and their grid position, e.g. a software for spot detection and/or a software for matching the detected spot to the grid.

The positions of the illumination features and their respective grid position may be used to determine, in particular to calculate, a bounding box for the illumination pattern. As used herein, the term "bounding box" may refer to a limit distinguishing between inside and outside of the illumination pattern. The outside may be a surrounding. The bounding box may be created with using some of the illumination features towards the edges of the pattern. The bounding box may have a shape selected from the group consisting of rectangle, circle, triangle, and the like. A bounding box with any known shape can be used, from which the deformation can be computed. The transfer device may be properly aligned if the deformation is eliminated and/or minimized.

Step b2) comprises comparing at least one property of the determined bounding box to at least one pre-defined and/or pre-known property of a target bounding box. The property of the bounding box may be related to at least one geometrical relation. The pre-defined and/or pre-known property of a target bounding box may be stored in at least one database of the evaluation device. As used herein, the term "target bounding box" may refer to a bounding box in case of proper alignment of the transfer device. For example, the bounding box is rectangular and the target bounding box fulfills the following rules:
  opposite sides of the rectangle are equal;
  a center coordinate of diagonals equals a half-point coordinate of the corresponding side.

The method step b2) comprises adapting a position and/or orientation of the transfer device in case a deviation of the property of the determined bounding box and the pre-defined and/or pre-known property exceeds at least one tolerance range. The tolerance range may be ±10%, preferably ±5%, more preferably ±2%. In case the tolerance range is not exceeded, the position and/or orientation of the transfer device may be maintained.

The method according to the present invention may allow reducing lower cost through higher projector yield and due to the possibility to make an active alignment of camera to projector during system production unnecessary. This is a significant time and money saver. In addition, higher performance and more robust calibration of our 3D sensing systems may be possible.

In a further aspect, a detector for determining a position of at least one object disclosed.

As used herein, the term "detector" may generally refer to an arbitrary sensor device configured for determining and/or detecting and/or sensing the at least one object. The detector may be a stationary device or a mobile device. Further, the detector may be a stand-alone device or may form part of another device, such as a computer, a vehicle or any other device. Further, the detector may be a hand-held device. Other embodiments of the detector are feasible. The detector may be one of attached to or integrated into a mobile device such as a mobile phone or smartphone. The detector may be integrated in a mobile device, e.g. within a housing of the mobile device. Additionally or alternatively, the detector, or at least one component of the detector, may be attached to the mobile device such as by using a connector such as a USB or phone-connector such as the headphone jack.

The object may be an arbitrary object, in particular a surface or region, which is configured to reflect at least partially at least one light beam impinging on the object. The light beam may originate from a projector illuminating the object, wherein the light beam is reflected or scattered by the object. For performing the method according to the present invention the object may be a target screen. However, after alignment the object may be any arbitrary object.

As used herein, the term "position" may refer to at least one item of information regarding a location of the object and/or at least one part of the object in space. Thus, the at least one item of information may imply at least one distance between at least one point of the object and the at least one detector. The distance may be a longitudinal coordinate or may contribute to determining a longitudinal coordinate of the point of the object. Additionally or alternatively, one or more other items of information regarding the location of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Moreover, the position may imply information about orientation of the object in space. As used herein, the term "orientation" refers to angular position of the object in space. The orientation may be given by three spatial angles.

The detector comprises
  at least one projector for illuminating at least one object with at least one illumination pattern comprising a plurality of illumination features, wherein the projector comprises at least one array of emitters, wherein each of the emitters is configured for generating at least one light beam, wherein the projector comprises at least one transfer device configured for generating the illumination features from the light beams impinging on the transfer device;

at least one camera having at least one sensor element having a matrix of optical sensors, the optical sensors each having a light-sensitive area, wherein each optical sensor is designed to generate at least one sensor signal in response to an illumination of its respective light-sensitive area by a reflection light beam generated in response to the illumination by the illumination pattern and propagating from the object to the camera, wherein the camera is configured for imaging at least one reflection image comprising a plurality of reflection features generated by the object in response to illumination by the illumination features, wherein each of the reflection features comprises at least one beam profile;

at least one evaluation device configured for determining at least one longitudinal coordinate for each of the reflection features by analysis of its respective beam profile.

The detector is configured for performing the method for alignment of optical components of a projector according to the present invention such as according to one or more of the embodiments disclosed above or according to one or more of the embodiments disclosed in further detail below. For details, options and definitions, reference may be made to the method as discussed above.

As used herein, the term "sensor element" may generally refer to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. The matrix specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

As used herein, an "optical sensor" generally may refer to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane.

As used herein, the term "the optical sensors each having at least one light sensitive area" refers to configurations with a plurality of single optical sensors each having one light sensitive area and to configurations with one combined optical sensor having a plurality of light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. Each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the setup. Other embodiments, however, are feasible. Thus, as an example, an optical device comprising two, three, four or more than four light-sensitive areas may be used which is regarded as two, three, four or more than four optical sensors in the context of the present invention. As outlined above, the sensor element comprises a matrix of optical sensors. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

The optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix may be composed of inorganic photodiodes. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Preferably, the sensor element may be oriented essentially perpendicular to an optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The reflection light beam may propagate from the object towards the camera. The reflection light beam may originate from the object. The projector may illuminate the object with the at least one illumination pattern and the light is remitted, reflected and/or scattered by the object and, thereby, is at least partially directed as "reflection light beams" towards the camera.

The reflection light beam specifically may fully illuminate the sensor element such that the sensor element is fully located within the light beam with a width of the light beam being larger than the matrix. Contrarily, preferably, the reflection light beam specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate further transfer device.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, one or more photodiodes may be used, such as commercially available photodiodes, e.g. inorganic semiconductor photodiodes.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be configured for process or preprocess the sensor signal, thereby generating secondary sensor signals, which may also be used as sensor signals, such as preprocessing by filtering or the like.

The detector may comprise at least one auxiliary camera. The projector may be arranged on one side of the object and the auxiliary camera is arranged on an opposite side of the object.

As used herein, the term "reflection image" may generally refer to an image determined by the optical sensor comprising a plurality of reflection features. As used herein, the term "reflection feature" may generally refer to a feature in an image plane generated by the object in response to illumination with at least one illumination feature. The reflection image may comprise the at least one reflection pattern comprising the reflection features. As used herein, the term "imaging at least one reflection image" refers to one or more of capturing, recording and generating of the reflection image.

Each of the reflection features comprises at least one beam profile. As used herein, the term "beam profile" generally may refer to a spatial distribution, in particular in at least one plane perpendicular to the propagation of the light beam, of an intensity of the light beam. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Other embodiments are feasible, however.

The evaluation device may be configured for selecting reflection features of the respective first and second reflection images. As used herein, the term "select at least one reflection feature" may generally refer to one or more of identifying, determining and choosing at least one reflection feature of the reflection image. The evaluation device may be configured for performing at least one image analysis and/or image processing in order to identify the reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors.

The evaluation device may be configured for performing at least one image correction. The image correction may comprise at least one background subtraction. The evaluation device may be adapted to remove influences from background light from the beam profile, for example, by an imaging without further illumination.

The detector may comprise at least one further transfer device configured for guiding the light beam onto the optical sensors and for forming the reflection image on the sensor element. The detector may further comprise one or more additional elements such as one or more additional optical elements. The further transfer device may be adapted to modify the light beam, such as by modifying one or more of a beam parameter of the light beam, a width of the light beam or a direction of the light beam. The further transfer device may be adapted to guide the light beam onto the optical sensor. The further transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system; at least one holographic optical element; at least one meta optical element. The further transfer device may have a focal length. As used herein, the term "focal length" of the further transfer device refers to a distance over which incident collimated rays which may impinge the transfer device are brought into a "focus" which may also be denoted as "focal point". Thus, the focal length constitutes a measure of an ability of the further transfer device to converge an impinging light beam. Thus, the further transfer device may comprise one or more imaging elements which can have the effect of a converging lens. By way of example, the further transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the further transfer device can comprise at least one wavelength-selective element, for example at least one optical filter. Additionally, the further transfer device can be designed to impress a predefined beam profile on the electromagnetic radiation, for example, at the location of the sensor region and in particular the sensor area. The abovementioned optional embodiments of the further transfer device can, in principle, be realized individually or in any desired combination.

The further transfer device may have an optical axis. In particular, the detector and the further transfer device have a common optical axis. As used herein, the term "optical axis of the further transfer device" generally refers to an axis of mirror symmetry or rotational symmetry of the lens or lens system. The optical axis of the detector may be a line of symmetry of the optical setup of the detector. For example, the detector comprises at least one further transfer device, preferably at least one transfer system having at least one lens. The further transfer system, as an example, may comprise at least one beam path, with the elements of the transfer system in the beam path being located in a rotationally symmetrical fashion with respect to the optical axis. Still, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths.

The further transfer device may constitute a coordinate system, wherein a longitudinal coordinate is a coordinate along the optical axis. The coordinate system may be a polar coordinate system in which the optical axis of the transfer device forms a z-axis and in which a distance from the z-axis and a polar angle may be used as additional coordinates. For example, the transfer device may constitute a coordinate system in which an optical axis of the detector forms the z-axis and in which, additionally, an x-axis and a y-axis may be provided which are perpendicular to the z-axis and which are perpendicular to each other. As an example, the detector may rest at a specific point in this coordinate system, such as at the origin of this coordinate system. A direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate. Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The evaluation device may be configured for determining the longitudinal coordinate for each of the reflection features by using a depth-from-photon-ratio technique, also denoted as beam profile analysis. With respect to depth-from-photon-ratio (DPR) technique reference is made to WO 2018/091649 A1, WO 2018/091638 A1, WO 2018/091640 A1 and C. Lennartz, F. Schick, S. Metz, "Whitepaper-Beam Profile Analysis for 3D imaging and material detection" Apr. 28, 2021, Ludwigshafen, Germany, the full content of which is included by reference.

The evaluation device is configured for determining at least one longitudinal coordinate, also denoted as $z_{DPR}$, for each of the reflection features by analysis of their beam profiles. As used herein, the term "analysis of the beam profile" may generally refer to evaluating of the beam profile and may comprise at least one mathematical operation and/or at least one comparison and/or at least symmetrizing and/or at least one filtering and/or at least one normalizing. For example, the analysis of the beam profile may comprise at least one of a histogram analysis step, a calculation of a difference measure, application of a neural network, application of a machine learning algorithm. The evaluation device may be configured for symmetrizing and/or for normalizing and/or for filtering the beam profile, in particular to remove noise or asymmetries from recording under larger angles, recording edges or the like. The evaluation device may filter the beam profile by removing high spatial frequencies such as by spatial frequency analysis and/or median filtering or the like. Summarization may be performed by center of intensity of the light spot and averaging all intensities at the same distance to the center. The evaluation device may be configured for normalizing the beam profile to a maximum intensity, in particular to account for intensity differences due to the recorded distance. The evaluation device may be configured for removing influences from background light from the beam profile, for example, by an imaging without illumination.

The reflection feature may cover or may extend over at least one pixel of the image. For example, the reflection feature may cover or may extend over plurality of pixels. The evaluation device may be configured for determining and/or for selecting all pixels connected to and/or belonging to the reflection feature, e.g. a light spot. The evaluation device may be configured for determining the center of intensity by $$R_{coi} = \frac{1}{I \cdot \sum j \cdot r_{pixel}},$$

wherein $R_{coi}$ is a position of center of intensity, pixel is the pixel position and $I=\Sigma_j I_{total}$ with j being the number of pixels j connected to and/or belonging to the reflection feature and $I_{total}$ being the total intensity.

The evaluation device may be configured for determining the beam profile of each of the reflection features. As used herein, the term "determining the beam profile" refers to identifying at least one reflection feature provided by the optical sensor and/or selecting at least one reflection feature provided by the optical sensor and evaluating at least one intensity distribution of the reflection feature. As an example, a region of the matrix may be used and evaluated for determining the intensity distribution, such as a three-dimensional intensity distribution or a two-dimensional intensity distribution, such as along an axis or line through the matrix. As an example, a center of illumination by the light beam may be determined, such as by determining the at least one pixel having the highest illumination, and a cross-sectional axis may be chosen through the center of illumination. The intensity distribution may an intensity distribution as a function of a coordinate along this cross-sectional axis through the center of illumination. Other evaluation algorithms are feasible.

The analysis of the beam profile of one of the reflection features may comprise determining at least one first area and at least one second area of the beam profile. The first area of the beam profile may be an area A1 and the second area of the beam profile may be an area A2. The evaluation device may be configured for integrating the first area and the second area. The evaluation device may be configured to derive a combined signal Q, also denoted as quotient Q, by one or more of dividing the integrated first area and the integrated second area, dividing multiples of the integrated first area and the integrated second area, dividing linear combinations of the integrated first area and the integrated second area.

The evaluation device may configured for determining at least two areas of the beam profile and/or to segment the beam profile in at least two segments comprising different areas of the beam profile, wherein overlapping of the areas may be possible as long as the areas are not congruent. For example, the evaluation device may be configured for determining a plurality of areas such as two, three, four, five, or up to ten areas. The evaluation device may be configured for segmenting the light spot into at least two areas of the beam profile and/or to segment the beam profile in at least two segments comprising different areas of the beam profile. The evaluation device may be configured for determining for at least two of the areas an integral of the beam profile over the respective area. The evaluation device may be configured for comparing at least two of the determined integrals. Specifically, the evaluation device may be configured for determining at least one first area and at least one second area of the beam profile. As used herein, the term "area of the beam profile" generally refers to an arbitrary region of the beam profile at the position of the optical sensor used for determining the combined signal. The first area of the beam profile and the second area of the beam profile may be one or both of adjacent or overlapping regions. The first area of the beam profile and the second area of the beam profile may be not congruent in area. For example, the evaluation device may be configured for dividing a sensor region of the sensor element into at least two sub-regions, wherein the evaluation device may be configured for dividing the sensor region of the sensor element into at least one left part and at least one right part and/or at least one upper part and at least one lower part and/or at least one inner and at least one outer part. Additionally or alternatively, the detector may comprise at least two optical sensors, wherein the light-sensitive areas of a first optical sensor and of a second optical sensor may be arranged such that the first optical sensor is adapted to determine the first area of the beam profile of the reflection feature and that the second optical sensor is adapted to determine the second area of the beam profile of the reflection feature. The evaluation device may be adapted to integrate the first area and the second area.

The first area of the beam profile may comprise essentially edge information of the beam profile and the second area of the beam profile comprises essentially center information of the beam profile, and/or the first area of the beam profile may comprise essentially information about a left part of the beam profile and the second area of the beam profile comprises essentially information about a right part of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably, the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be configured for determining an area integral of the beam profile. The evaluation device may be configured for determining the edge information by integrating and/or summing of the first area. The evaluation device may be configured for determining the center information by integrating and/or summing of the second area. For example, the beam profile may be a trapezoid beam profile and the evaluation device may be configured for determining an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

In one embodiment, A1 may correspond to a full or complete area of a feature point on the optical sensor. A2 may be a central area of the feature point on the optical sensor. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

In one embodiment, the illumination pattern may comprise at least point pattern. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 of the full radius, preferably from 0.4 to 0.6 of the full radius.

The evaluation device may be configured to derive the quotient Q by one or more of dividing the first area and the second area, dividing multiples of the first area and the second area, dividing linear combinations of the first area and the second area. The evaluation device may be configured for deriving the quotient Q by $$Q = \frac{\iint_{A1} E(x, y) dx dy}{\iint_{A2} E(x, y) dx dy}$$

wherein x and y are transversal coordinates, A1 and A2 are the first and second area of the beam profile, respectively, and E(x,y) denotes the beam profile.

Additionally or alternatively, the evaluation device may be adapted to determine one or both of center information or edge information from at least one slice or cut of the light spot. This may be realized, for example, by replacing the area integrals in the quotient Q by a line integral along the slice or cut. For improved accuracy, several slices or cuts through the light spot may be used and averaged. In case of an elliptical spot profile, averaging over several slices or cuts may result in improved distance information.

For example, in case of the optical sensor having a matrix of pixels, the evaluation device may be configured for evaluating the beam profile, by determining the pixel having the highest sensor signal and forming at least one center signal;

evaluating sensor signals of the matrix and forming at least one sum signal;

determining the quotient Q by combining the center signal and the sum signal; and determining at least one longitudinal coordinate z of the object by evaluating the quotient Q.

The sensor signal may be a signal generated by the optical sensor and/or at least one pixel of the optical sensor in response to illumination. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like. The term "center signal" generally refers to the at least one sensor signal comprising essentially center information of the beam profile. As used herein, the term "highest sensor signal" refers to one or both of a local maximum or a maximum in a region of interest. For example, the center signal may be the signal of the pixel having the highest sensor signal out of the plurality of sensor signals generated by the pixels of the entire matrix or of a region of interest within the matrix, wherein the region of interest may be predetermined or determinable within an image generated by the pixels of the matrix. The center signal may arise from a single pixel or from a group of optical sensors, wherein, in the latter case, as an example, the sensor signals of the group of pixels may be added up, integrated or averaged, in order to determine the center signal. The group of pixels from which the center signal arises may be a group of neighboring pixels, such as pixels having less than a predetermined distance from the actual pixel having the highest sensor signal, or may be a group of pixels generating sensor signals being within a predetermined range from the highest sensor signal. The group of pixels from which the center signal arises may be chosen as large as possible in order to allow maximum dynamic range. The evaluation device may be adapted to determine the center signal by integration of the plurality of sensor signals, for example the plurality of pixels around the pixel having the highest sensor signal. For example, the beam profile may be a trapezoid beam profile and the evaluation device may be adapted to determine an integral of the trapezoid, in particular of a plateau of the trapezoid.

As outlined above, the center signal generally may be a single sensor signal, such as a sensor signal from the pixel in the center of the light spot, or may be a combination of a plurality of sensor signals, such as a combination of sensor signals arising from pixels in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of pixels containing the pixel having the highest sensor signal and a predetermined group of neighboring pixels; a sum of sensor signals from a group of pixels containing the pixel having the highest sensor signal and a predetermined group of neighboring pixels; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring pixels; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The quotient Q may be a signal which is generated by combining the center signal and the sum signal. Specifically, the determining may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the quotient Q may comprise an arbitrary signal or signal combination which contains at least one item of information on a comparison between the center signal and the sum signal.

As used herein, the term "longitudinal coordinate of the object" refers to a distance between the optical sensor and the object. The evaluation device may be configured for using the at least one predetermined relationship between the combined signal and the longitudinal coordinate for determining the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The evaluation device may be configured for executing at least one depth-from-photon-ratio algorithm which computes distances for all reflection features with zero order and higher order.

The evaluation device may be configured for assigning said reflection feature to the corresponding emitter. As used herein, the term "assigning said reflection feature to the corresponding emitter of the array" may generally refer to determining, in particular unambiguously, the one emitter of the array having emitted the illumination feature having caused the selected reflection feature. In known 3D sensing devices, such as devices using triangulation or structured light techniques, solving this correspondence problem is complex and time consuming. The evaluation device may be configured for unambiguously matching of reflection features with corresponding emitters by using the longitudinal coordinate zDPR. The longitudinal coordinate determined with the depth-from-photon-ratio technique can be used for solving the correspondence problem. In that way, distance information per reflection feature can be used to find the correspondence of the known array of emitters. As used herein, the term "matching" may refer to identifying and/or determining and/or evaluating the corresponding emitter and the reflection feature. As used herein, the term "corresponding emitter and reflection feature" may refer to the fact that each of the illumination features of the illumination pattern was generate by one of the emitters, projected to the objected and imaged as reflection feature by the camera, wherein the imaged reflection feature is assigned to the illumination feature having generated said reflection feature. As used herein, the term "unambiguously matching" may refer to that only one reflection feature is assigned to one illumination feature, and thus the emitter, and/or that no other reflection features can be assigned to the same matched illumination feature.

The illumination feature, and thus, the emitter, corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that an illumination image, i.e. an image of the non-distorted illumination pattern, and the reflection image may be images determined at different spatial positions and/or spatial orientations having a fixed distance. The distance may be a relative distance, also denoted as baseline. The illumination image may be also denoted as reference image. The evaluation device may be adapted to determine an epipolar line in the reference image. The relative position of the reference image and reflection image may be known. For example, the relative position of the reference image and the reflection image may be stored within at least one storage unit of the evaluation device. The evaluation device may be adapted to determine a straight line extending from a selected reflection feature of the reflection image to a real world feature from which it originates. Thus, the straight line may comprise possible object features corresponding to the selected reflection feature. The straight line and the baseline span an epipolar plane. As the reference image is determined at a different relative constellation from the reflection image, the corresponding possible object features may be imaged on a straight line, called epipolar line, in the reference image. The epipolar line may be the intersection of the epipolar plane and the reference image. Thus, a feature of the reference image corresponding to the selected feature of the reflection image lies on the epipolar line.

Depending on the distance to the object having reflected the illumination feature, the reflection feature corresponding to the illumination feature may be displaced within the reflection image. The reference image may comprise at least one displacement region in which the illumination feature corresponding to the selected reflection feature would be imaged. The displacement region may comprise only one illumination feature. The displacement region may also comprise more than one illumination feature. The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device may be adapted to determine the illumination feature along the epipolar line. The evaluation device may be adapted to determine the longitudinal coordinate z for the reflection feature and an error interval ±ε from the combined signal Q to determine a displacement region along an epipolar line corresponding to z±ε or orthogonal to an epipolar line. The measurement uncertainty of the distance measurement using the combined signal Q may result in a displacement region in the second image which is non-circular since the measurement uncertainty may be different for different directions. Specifically, the measurement uncertainty along the epipolar line or epipolar lines may be greater than the measurement uncertainty in an orthogonal direction with respect to the epipolar line or lines. The displacement region may comprise an extend in an orthogonal direction with respect to the epipolar line or epipolar lines. The evaluation device may be adapted to match the selected reflection feature with at least one illumination feature within the displacement region. The evaluation device may be adapted to match the selected feature of the reflection image with the illumination feature within the displacement region by using at least one evaluation algorithm considering the determined longitudinal coordinate $z_{DPR}$. The evaluation algorithm may be a linear scaling algorithm. The evaluation device may be adapted to determine the epipolar line closest to and/or within the displacement region. The evaluation device may be adapted to determine the epipolar line closest to the image position of the reflection feature. The extent of the displacement region along the epipolar line may be larger than the extent of the displacement region orthogonal to the epipolar line. The evaluation device may be adapted to determine an epipolar line before determining a corresponding illumination feature. The evaluation device may determine a displacement region around the image position of each reflection feature. The evaluation device may be adapted to assign an epipolar line to each displacement region of each image position of the reflection features, such as by assigning the epipolar line closest to a displacement region and/or within a displacement region and/or closest to a displacement region along a direction orthogonal to the epipolar line. The evaluation device may be adapted to determine the illumination feature corresponding to the reflection feature by determining the illumination feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured to perform the following steps:
  Determining a displacement region for the image position of each reflection feature;
  Assigning an epipolar line to the displacement region of each reflection feature such as by assigning the epipolar line closest to a displacement region and/or within a displacement region and/or closest to a displacement region along a direction orthogonal to the epipolar line;
  Assigning and/or determining at least one illumination feature to each reflection feature such as by assigning the illumination feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be adapted to decide between more than one epipolar line and/or illumination feature to be assigned to a reflection feature such as by comparing distances of reflection features and/or epipolar lines within the illumination image and/or by comparing error weighted distances, such as ε-weighted distances of illumination features and/or epipolar lines within the illumination image and assigning the epipolar line and/or illumination feature in shorter distance and/or ε-weighted distance to the illumination feature and/or reflection feature.

The evaluation device may be configured for determining at least one longitudinal coordinate $z_{triang}$ by using at least one triangulation method. The evaluation device may be adapted to determine a displacement of the illumination feature and the reflection feature. The evaluation device may be adapted to determine the displacement of the matched illumination feature and the selected reflection feature. The evaluation device, e.g. at least one data processing device of the evaluation device, may be configured to determine the displacement of the illumination feature and the reflection feature, in particular by comparing the respective image position of the illumination image and the reflection image. As used herein, the term "displacement" may refer to the difference between an image position in the illumination image to an image position in the reflection image. The evaluation device may be adapted to determine the second longitudinal coordinate of the matched feature using a predetermined relationship between the second longitudinal coordinate and the displacement. The evaluation device may be adapted to determine the pre-determined relationship by using triangulation methods. Other methods for determining at least one longitudinal coordinate such as depth-from-defocus and/or structured light techniques may be possible, too.

In a further aspect, a mobile device configured for determining a position of at least one object is disclosed. The mobile device comprises at least one detector according to the present invention such as according to one or more of the embodiments disclosed above or according to one or more of the embodiments disclosed in further detail below. For details, options and definitions, reference may be made to the detector as discussed above.

The mobile device is one or more of a mobile communication device such as a cell phone or smartphone, a tablet computer, a portable computer.

In a further aspect a computer program including computer-executable instructions for performing the method according to the present invention when the program is executed on a computer or computer network.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application; a gait monitoring application; a human body monitoring application; home care; smart living, automotive application.

With respect to further uses of the detector and devices of the present invention reference is made to WO 2018/091649 A1, WO 2018/091638 A1, WO 2018/091640 A1 and C. Lennartz, F. Schick, S. Metz, "Whitepaper-Beam Profile Analysis for 3D imaging and material detection" Apr. 28, 2021, Ludwigshafen, Germany, the content of which is included by reference.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. Herein, in most cases, when referring to the respective feature or element, the expressions "at least one" or "one or more" are not repeated, non-withstanding the fact that the respective feature or element may be present once or more than once.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person recognizes, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

Overall, in the context of the present invention, the following embodiments are regarded as preferred:

Embodiment 1. A method for alignment of optical components of a projector for illuminating at least one object with at least one illumination pattern comprising a plurality of illumination features, wherein the projector comprises at least one array of emitters, wherein each of the emitters is configured for generating at least one light beam, wherein the projector comprises at least one transfer device configured for generating the illumination features from the light beams impinging on the transfer device, wherein the method comprises the following steps:

a) at least one emitter array alignment step, comprising
generating a light beam by each of the emitters and illuminating a surface of the object with the light beams without the transfer device between the array of emitters and the object thereby generating a spot on the object,
imaging at least one image of the spot by using at least one camera,
determining at least one intensity distribution of the spot by evaluating the image of the spot and comparing the determined intensity distribution to at least one pre-defined and/or pre-known intensity distribution using at least one evaluation device,
and adapting an orientation of the array of emitters such that a central axis of the array of emitters is perpendicular to the surface of the object in case a deviation of the determined intensity distribution and the pre-defined and/or pre-known intensity distribution exceeds at least one tolerance range;

b) at least one transfer device alignment step comprising
b1) marking a center position of the spot on the object,
arranging the transfer device between the array of emitters and the object such that an optical axis of the transfer device is perpendicular to the surface of the object,
generating a light beam by each of the emitters, illuminating the surface of the object with the light beams with the transfer device between the array of emitters and the object thereby generating the illumination pattern on the object,
imaging at least one image of the object illuminated by the illumination pattern by using the camera,
evaluating the image of the object thereby determining a center of the illumination pattern on the object using the evaluation device,
comparing the determined center and the marked center position,
adapting a position of the center to the marked center position by translating the array of emitters in regard to the transfer device in case a deviation of the center and the marked center position exceeds at least one tolerance range,
and/or
b2) arranging the transfer device between the array of emitters and the object,
generating a light beam by each of the emitters, illuminating the surface of the object with the light beams with the transfer device between the array of emitters and the object thereby generating the illumination pattern on the object,
imaging at least one image of the object illuminated by the illumination pattern by using the camera,
evaluating the image of the object thereby determining a bounding box of the illumination pattern by using the evaluation device,
comparing at least one property of the determined bounding box to at least one pre-defined and/or pre-known property of a target bounding box and
adapting a position and/or orientation of the transfer device in case a deviation of the property of the determined bounding box and the pre-defined and/or pre-known property exceeds at least one tolerance range.

Embodiment 2. The method according to the preceding embodiment, wherein each of the emitter is and/or comprises at least one element selected from the group consisting of at least one laser source such as at least one semi-conductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser (VCSEL); at least one non-laser light source such as at least one LED or at least one light bulb.

Embodiment 3. The method according to any one of the preceding embodiments, wherein the camera comprises at least one CCD camera or at least one CMOS camera.

Embodiment 4. The method according to any one of the preceding embodiments, wherein the transfer device comprises at least one imaging optical device.

Embodiment 5. The method according to any one of the preceding embodiments, wherein the object is at least one target screen.

Embodiment 6. The method according to the preceding embodiment, wherein the object is at least one semi-transparent target screen, wherein the projector is arranged on one side of the target screen and the camera is arranged on an opposite side of the target screen.

Embodiment 7. The method according to the pre-preceding embodiment, wherein the object is a non-transparent target screen, wherein the projector and the camera are arranged on the same side of the target screen.

Embodiment 8. The method according to any one of the preceding embodiments, wherein step a) comprises removing the transfer device from the projector.

Embodiment 9. The method according to any one of the preceding embodiments, wherein the bounding box is determined using at least some illumination features towards at least one edge of the illumination pattern.

Embodiment 10. The method according to any one of the preceding embodiments, wherein the bounding box has a shape selected from the group consisting of rectangle, circle, triangle, and the like.

Embodiment 11. The method according to any one of the preceding embodiments, wherein the evaluation device is configured for identifying illumination features on the image of the object illuminated by the illumination pattern and for determining their respective spot positions and/or grid positions.

Embodiment 12. The method according to any one of the preceding embodiments, wherein the property of the bounding box is related to at least one geometrical relation.

Embodiment 13. The method according to the preceding embodiment, wherein the bounding box is rectangular and the target bounding box fulfills the following rules:
opposite sides of the rectangle are equal;
a center coordinate of diagonals equals a half-point coordinate of the corresponding side.

Embodiment 14. A detector for determining a position of at least one object, the detector comprising
at least one projector for illuminating at least one object with at least one illumination pattern comprising a plurality of illumination features, wherein the projector comprises at least one array of emitters, wherein each of the emitters is configured for generating at least one light beam, wherein the projector comprises at least one transfer device configured for generating the illumination features from the light beams impinging on the transfer device;
at least one camera having at least one sensor element having a matrix of optical sensors, the optical sensors each having a light-sensitive area, wherein each optical sensor is designed to generate at least one sensor signal in response to an illumination of its respective light-sensitive area by a reflection light beam generated in response to the illumination by the illumination pattern and propagating from the object to the camera, wherein the camera is configured for imaging at least one reflection image comprising a plurality of reflection features generated by the object in response to illumination by the illumination features, wherein each of the reflection features comprises at least one beam profile;
at least one evaluation device configured for determining at least one longitudinal coordinate for each of the reflection features by analysis of its respective beam profile,
wherein the detector is configured for performing the method for alignment of optical components of a projector according to any one of the preceding embodiments.

Embodiment 15. The detector according to the preceding embodiment, wherein the detector comprises at least one auxiliary camera, wherein the projector is arranged on one side of the object and the auxiliary camera is arranged on an opposite side of the object.

Embodiment 16. The detector according to any one of the preceding embodiments, wherein the evaluation device is configured for determining the longitudinal coordinate for each of the reflection features by using a depth-from-photon-ratio technique.

Embodiment 17. The detector according to the preceding embodiment, wherein the analysis of the beam profile comprises determining at least one first area and at least one second area of the beam profile, wherein the evaluation device is configured for deriving a combined signal Q by one or more of dividing the first area and the second area, dividing multiples of the first area and the second area, dividing linear combinations of the first area and the second area, wherein the evaluation device is configured for using at least one predetermined relationship between the combined signal Q and the longitudinal coordinate for determining the longitudinal coordinate.

Embodiment 18. The detector according to any one of the preceding embodiments, wherein the detector comprises at least one further transfer device configured for guiding the light beam onto the optical sensors and for forming the reflection image on the sensor element.

Embodiment 19. A mobile device configured for determining a position of at least one object, wherein the mobile device comprises at least one detector according to any one of the preceding embodiments, wherein the mobile device is one or more of a mobile communication device, a tablet computer, a portable computer.

Embodiment 20. A use of the detector according to any one of the preceding embodiments referring to a detector, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application; a gait monitoring application; a human body monitoring application; home care; smart living, automotive application.

Embodiment 21. A method for alignment of optical components of a projector for illuminating at least one object with at least one illumination pattern comprising a plurality of illumination features, wherein the projector comprises at least one array of emitters, wherein each of the emitters is configured for generating at least one light beam, wherein the projector comprises at least one transfer device configured for generating the illumination features from the light beams impinging on the transfer device, wherein the method comprises at least one of the following steps:
a) at least one emitter array alignment step, comprising
generating a light beam by each of the emitters and illuminating a surface of the object with the light beams without the transfer device between the array of emitters and the object thereby generating a spot on the object,
imaging at least one image of the spot by using at least one camera,
determining at least one intensity distribution of the spot by evaluating the image of the spot and comparing the determined intensity distribution to at least one pre-defined and/or pre-known intensity distribution using at least one evaluation device,
and adapting an orientation of the array of emitters such that a central axis of the array of the emitters is perpendicular to the surface of the object in case a deviation of the determined intensity distribution and the pre-defined and/or pre-known intensity distribution exceeds at least one tolerance range;

b) at least one transfer device alignment step comprising
b1) marking a center position of the spot on the object,
arranging the transfer device between the array of emitters and the object such that an optical axis of the transfer device is perpendicular to the surface of the object,
generating a light beam by each of the emitters, illuminating the surface of the object with the light beams with the transfer device between the array of emitters and the object thereby generating the illumination pattern on the object,
imaging at least one image of the object illuminated by the illumination pattern by using the camera,
evaluating the image of the object thereby determining a center of the illumination pattern on the object using the evaluation device,
comparing the determined center and the marked center position,
adapting a position of the center to the marked center position by translating the array of emitters in regard to the transfer device in case a deviation of the center and the marked center position exceeds at least one tolerance range,
and/or
b2) arranging the transfer device between the array of emitters and the object,
generating a light beam by each of the emitters, illuminating the surface of the object with the light beams with the transfer device between the array of emitters and the object thereby generating the illumination pattern on the object,
imaging at least one image of the object illuminated by the illumination pattern by using the camera,
evaluating the image of the object thereby determining a bounding box of the illumination pattern by using the evaluation device,
comparing at least one property of the determined bounding box to at least one pre-defined and/or pre-known property of a target bounding box and
adapting a position and/or orientation of the transfer device in case a deviation of the property of the determined bounding box and the pre-defined and/or pre-known property exceeds at least one tolerance range.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
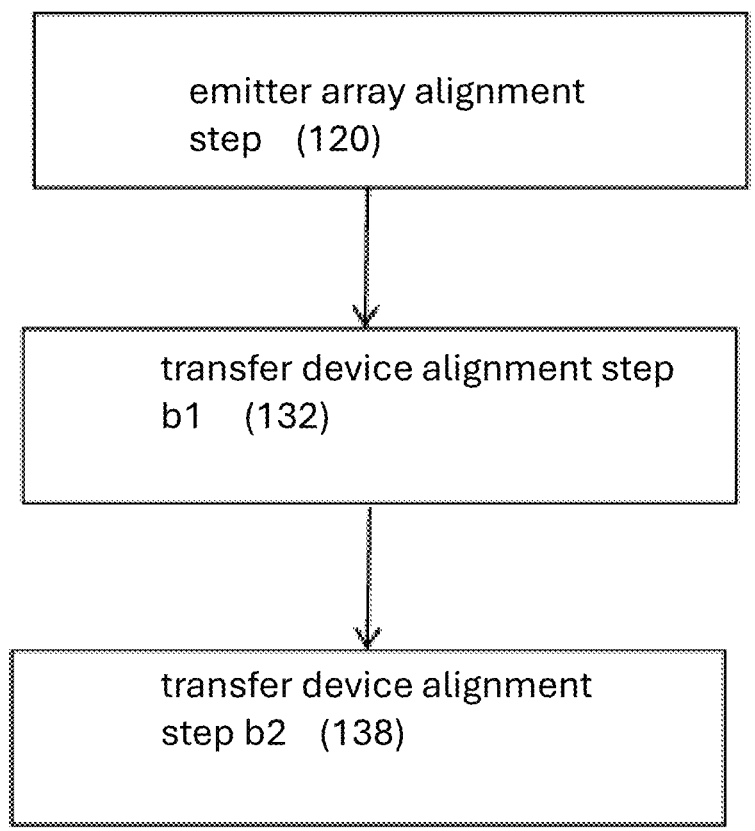
FIG. 1 shows an embodiment of a method for alignment of optical components of a projector for illuminating at least one object with at least one illumination pattern according to the present invention.

FIG. 1 shows a flowchart of a method for alignment of optical components of a projector 110 for illuminating at least one object 112 with at least one illumination pattern 114 comprising a plurality of illumination features.

The projector 110 comprises at least one array of emitters 116. Each of the emitters is configured for generating at least one light beam. The projector 110 comprises at least one transfer device 118 configured for generating the illumination features from the light beams impinging on the transfer device 118.

The method steps may be performed in the given order or may be performed in a different order. Further, one or more additional method steps may be present which are not listed. Further, one, more than one or even all of the method steps may be performed repeatedly.

The method comprises the following steps:
a) (denoted with reference number 120) at least one emitter array alignment step, comprising
generating a light beam by each of the emitters and illuminating a surface of the object with the light beams without the transfer device 118 between the array of emitters 116 and the object 112 thereby generating a spot 122 on the object 112,
imaging at least one image of the spot 122 by using at least one camera 124,
determining at least one intensity distribution 126 of the spot 122 by evaluating the image of the spot 122 and comparing the determined intensity distribution 126 to at least one pre-defined and/or pre-known intensity distribution using at least one evaluation device 128,
adapting an orientation of the array of emitters 116 such that a central axis 130 of the array of the emitters 116 is perpendicular to the surface of the object 112 in case a deviation of the determined intensity distribution 126 and the pre-defined and/or pre-known intensity distribution exceeds at least one tolerance range;
b) at least one transfer device alignment step comprising
b1) (denoted with reference number 132) marking a center position of the spot 122 on the object 112,
arranging the transfer device 118 between the array of emitters 116 and the object 112 such that an optical axis 134 of the transfer device 118 is perpendicular to the surface of the object 112,
generating a light beam by each of the emitters, illuminating the surface of the object 112 with the light beams with the transfer device 118 between the array of emitters 116 and the object 112 thereby generating the illumination pattern 114 on the object 112,
imaging at least one image of the object 112 illuminated by the illumination pattern 114 by using the camera 124, evaluating the image of the object 112 thereby determining a center 136 of the illumination pattern 114 on the object 112 using the evaluation device 128, comparing the determined center 136 and the marked center position, adapting a position of the center 136 to the marked center position by translating the array of emitters 116 in regard to the transfer device 118 in case a deviation of the center 136 and the marked center position exceeds at least one tolerance range, and/or b2) (denoted with reference number 138) arranging the transfer device 118 between the array of emitters 116 and the object 112, generating a light beam by each of the emitters, illuminating the surface of the object 112 with the light beams with the transfer device 118 between the array of emitters 116 and the object 112 thereby generating the illumination pattern 114 on the object 112, imaging at least one image of the object 112 illuminated by the illumination pattern 114 by using the camera 124, evaluating the image of the object 112 thereby determining a bounding box 140 of the illumination pattern 114 by using the evaluation device 128, comparing at least one property of the determined bounding box 140 to at least one pre-defined and/or pre-known property of a target bounding box 142 and adapting a position and/or orientation of the transfer device 118 in case a deviation of the property of the determined bounding box 140 and the pre-defined and/or pre-known property exceeds at least one tolerance range.

The projector 110 may be configured for generating and projecting the at least one illumination pattern 114 onto the object 112, specifically onto a surface of the object 112. The projector 110 comprises the array of emitters 116 and the transfer device 118 as optical components. The projector 110 may comprise additional optical components.

The at least one illumination pattern 114 may comprise at least one arbitrary pattern comprising the illumination features adapted to illuminate at least one part of the object 112. The illumination pattern 114 comprises a plurality of illumination features. The illumination pattern 114 may be selected from the group consisting of: at least one point pattern; at least one line pattern; at least one stripe pattern; at least one checkerboard pattern; at least one pattern comprising an arrangement of periodic or non periodic features. The illumination pattern 114 may comprise regular and/or constant and/or periodic pattern such as a triangular pattern, a rectangular pattern, a hexagonal pattern or a pattern comprising further convex tilings. The illumination pattern 114 may exhibit the at least one illumination feature selected from the group consisting of: at least one point; at least one line; at least two lines such as parallel or crossing lines; at least one point and one line; at least one arrangement of periodic or non-periodic feature; at least one arbitrary shaped featured. The illumination pattern 114 may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the projector 110 may be configured for generate and/or to project a cloud of points or non-point-like features. For example, the projector 110 may be configured for generate a cloud of points or non-point-like features such that the illumination pattern 114 may comprise a plurality of point features or non-point-like features. The illumination pattern 114 may comprise regular and/or constant and/or periodic patterns such as a triangular pattern, a rectangular pattern, a hexagonal pattern, or a pattern comprising further convex tilings. The illumination pattern 114 may comprise as many features per area as possible such that a hexagonal pattern may be preferred. A distance between two features of the respective illumination pattern 114 and/or an area of the at least one illumination feature may depend on a circle of confusion in an image determined by at least one detector. For example, illumination pattern 114 may comprise a periodic point pattern.

Each of the emitters may be and/or may comprise at least one element selected from the group consisting of at least one laser source such as at least one semi-conductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser (VCSEL), in particular at least one VCSEL-array; at least one non-laser light source such as at least one LED or at least one light bulb.

The array of emitters 116 may be a two-dimensional or one dimensional array. The array 116 may comprise a plurality of emitters arranged in a matrix. The matrix specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point.

For example, the emitters may be an array of VCSELs. The vertical-cavity surface-emitting laser may be a semiconductor laser diode configured for laser beam emission perpendicular with respect to a top surface. Examples for VCSELs can be found e.g. in en.wikipedia.org/wiki/Vertical-cavity_surface-emitting_laser. VCSELs are generally known to the skilled person such as from WO 2017/222618 A. Each of the VCSELs is configured for generating at least one light beam. The VCSELs may be arranged on a common substrate or on different substrates. The array 116 may comprise up to 2500 VCSELs. For example, the array 116 may comprise 38×25 VCSELs, such as a high power array with 3.5 W. For example, the array 116 may comprise 10×27 VCSELs with 2.5 W. For example, the array 116 may comprise 96 VCSELs with 0.9 W. A size of the array, e.g. of 2500 elements, may be up to 2 mm×2 mm.

The light beam emitted by the respective emitter may have a wavelength of 300 to 1100 nm, preferably 500 to 1100 nm. For example, the light beam may have a wavelength of 940 nm. For example, light in the infrared spectral range may be used, such as in the range of 780 nm to 3.0 µm. Specifically, the light in the part of the near infrared region where silicon photodiodes are applicable specifically in the range of 700 nm to 1100 nm may be used. The emitters may be configured for generating the at least one illumination pattern in the infrared region, in particular in the near infrared region. Using light in the near infrared region may allows that light is not or only weakly detected by human eyes and is still detectable by silicon sensors, in particular standard silicon sensors. For example, the emitters may be an array of VCSELs. The VCSELs may be configured for emitting light beams at a wavelength range from 800 to 1000 nm. For example, the VCSELs may be configured for emitting light beams at 808 nm, 850 nm, 940 nm, or 980 nm. Preferably the VCSELs emit light at 940 nm, since terrestrial sun radiation has a local minimum in irradiance at this wavelength, e.g. as described in CIE 085-1989 "Solar spectral Irradiance".

The projector 110 comprises the transfer device 118 configured for generating the illumination features from the light beams impinging on the transfer device 118. The transfer device 118 specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system; at least one holographic optical element; at least one meta optical element. Specifically, the transfer device 118 comprises at least one refractive optical lens stack. Thus, the transfer device 118 may comprise a multi-lens system having refractive properties.

Figure 2:
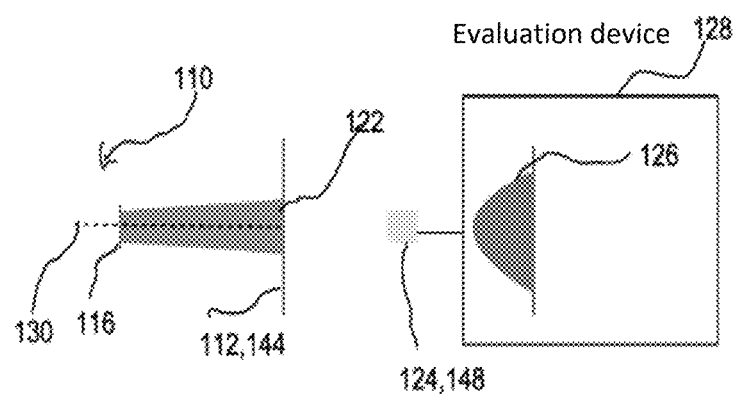
FIG. 2 shows an aligned array of emitters with a target screen and an auxiliary camera.

The emitter array alignment step 120 may comprise, in a first step, using the array of emitters 116 without the transfer device 118. Step a) 120 may comprise removing the transfer device 118 from the projector 110. In this configuration, as shown in FIG. 2, the array of emitters 116 may produce only one big spot 122 which is imaged by the at least one camera 124.

The method according to the present invention may be an active alignment process. Therefore at least one camera 124 is used in steps a) and b), e.g. for imaging the illumination pattern 114 during the alignment process. The camera 124 may refer to a device having at least one imaging element configured for recording or capturing spatially resolved one-dimensional, two-dimensional or even three-dimensional optical data or information. As an example, the camera 124 may comprise at least one camera chip, such as at least one CCD chip and/or at least one CMOS chip configured for recording images.

The object 112 used for the method may be at least one target screen 144. The target screen 144 may comprise a projection screen having a planar surface configured for displaying a projected light beam. For example, the target screen 144 is at least one semi-transparent target screen 144. The semi-transparent target screen 144 may permit light, in particular of a certain wavelength range, impinging on the target screen 144 at least partially to pass. For example, the semi-transparent target screen 144 may allow at least 30% of the light to pass. The projector 110 may be arranged on one side of the target screen 144 and the camera 124 is arranged on an opposite side of the target screen 144. In this example, the optical setup may comprise two cameras 124. A first camera 146 may be a camera of a detector according to the present invention used for 3D sensing. A second camera 148, also denoted as auxiliary camera, may be used for the method for alignment. The auxiliary camera 148 may be combined with the semi-transparent screen 144 with the projector 110 on the opposite side of the screen. Alternatively, a non-transparent screen 144 and the camera 146 of the 3D imaging system can be used. The object 112 may be a non-transparent target screen. The projector 110 and the camera 124 may be arranged on the same side of the target screen 144.

The array of emitters 116 may comprise the so-called central axis 130 of the array of emitters 116, i.e. an axis perpendicular to the surface of the emitters going through the center of the array 116. The central axis 130 may be parallel to, in particular coincides with, an axis perpendicular to the surface of the target screen 144, in case the array of emitters 116 is properly aligned. "Properly aligned" may refer to that the central axis 130 of the array of emitters 116 is parallel to, in particular coincides with, the axis perpendicular to the surface of the target screen 144 at least within tolerance. Otherwise, the light beams generated by the emitters may propagate tilted with respect to the axis perpendicular to the surface of the target screen 144, e.g. including an angle with the axis. As an example, in case of proper alignment of the central axis 130 of the array of emitters 116 and the axis perpendicular to the surface of the target screen 144 may include an angle of less than 10°, preferably less than 5° or even less than 2°. Other embodiments, however, are feasible. FIG. 2 shows an aligned array of emitters 116, with the target screen 144 and an auxiliary camera 148.

Figure 3:
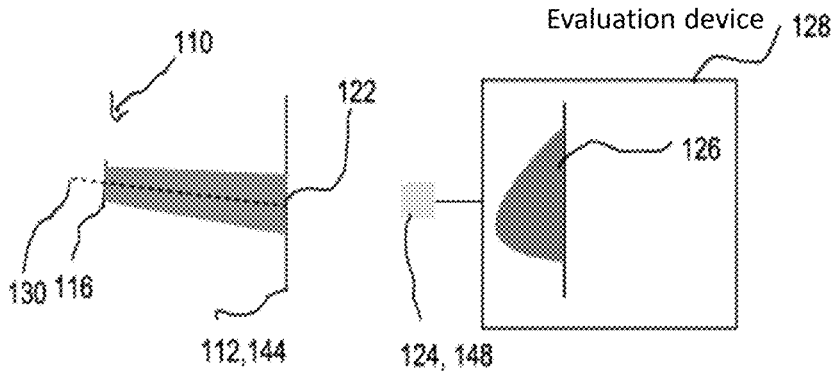
FIG. 3 shows a not aligned array of emitters with a target screen and an auxiliary camera before performing step a)

The spot 122 may be used to align the central axis 130 of the array of emitters 116 to be perpendicular to the target screen 114. In case the central axis 130 of the array of emitters 116 is not perpendicular to the target screen 144, the spot 122 is distorted. The spot 122 may comprise an intensity distribution 126 in the plane of the surface of the target screen 144. This plane may also be denoted the xy-plane. A direction perpendicular to the plane may be denoted as z-direction. The intensity distribution 126 may have a centroid. In case of proper alignment of the array of emitters 116, the centroid may be at its target position. The target position may coincide with the center point of the spot 122. However, in case the array of emitters 116 is tilted, the centroid of the spot 122 shifts away from its target position. FIG. 3 depicts a tilted the array of emitters 116 with the target screen 144 and the auxiliary camera 148. Due to a tilt, the centroid of the visible spot 122 shifts away from desired position. In the case that the central axis 130 of the array of emitters 116 is not perpendicular to the target, the spot 122 is distorted (see FIG. 3). The evaluation device 128 is configured for determining the intensity distribution 126 of the spot 122 by evaluating the image of the spot 122.

The evaluation device 128 may be adapted to perform the named operations, preferably by using at least one data processing device and, more preferably, by using at least one processor and/or at least one application-specific integrated circuit. Thus, as an example, the at least one evaluation device 128 may comprise at least one data processing device having a software code stored thereon comprising a number of computer commands. The evaluation device 128 may provide one or more hardware elements for performing one or more of the named operations and/or may provide one or more processors with software running thereon for performing one or more of the named operations. Operations, including evaluating the images. Thus, as an example, one or more instructions may be implemented in software and/or hardware. Thus, as an example, the evaluation device 128 may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation. Additionally or alternatively, however, the evaluation device 128 may also fully or partially be embodied by hardware.

The evaluation device 128 may be configured for performing at least one image analysis and/or image processing in order to identify the spot 122. The image analysis and/or image processing may use at least one feature, in particular spot, detection algorithm.

The evaluation device 128 may be configured for determining the one or two dimensional intensity distribution 126 from the image of the spot 122, in particular by evaluating intensity values of the pixels of the camera 124. The evaluation device 128 may be configured for determining a centroid of the intensity distribution 126.

The method comprises comparing the determined intensity distribution 126 to at least one pre-defined and/or pre-known intensity distribution by using the evaluation device 128. The pre-defined and/or pre-known intensity distribution may comprise a complete intensity distribution such as intensity as a function of at least one of x and y and/or to at least one property characterizing the intensity distribution such as the target position of the centroid. The pre-defined and/or pre-known intensity distribution may be an intensity distribution and/or the target position of the centroid of the intensity distribution of a properly aligned array of emitters 116. The pre-defined and/or pre-known intensity distribution may be stored in at least one database of the evaluation device 128. For example, the target position of the centroid of the intensity distribution of the properly aligned array of emitters 116 is compared to the centroid of the imaged intensity distribution 126. In case a deviation of the determined intensity distribution and the pre-defined and/or pre-known intensity distribution exceeds at least one tolerance range, the method comprises adapting an orientation of the array of emitters 116 such as mechanically by changing a tilt angle, in particular tilting the array of emitters. Otherwise, i.e. in case the deviation of the determined intensity distribution and the pre-defined and/or pre-known intensity distribution is within the at least one tolerance range, the method may proceed with step b). The tolerance range may be ±10%, preferably ±5%, more preferably ±2%.

In step b1), after the array of emitters 116 is properly aligned, the center position of the spot 122 is marked. The marking may comprise applying at least one marker to the center position such as at least one highlighting, at least one cross, or the like. The marking may be performed manually or automatically.

The transfer device 118 is arranged between the array of emitters 116 and the object 112. The transfer device 118 may be put on top of the array of the emitters 116 so that the illumination pattern 114 becomes visible. The optical axis 134 of the transfer device 118 may be pre-known and may be aligned perpendicular to the target screen 144, e.g. mechanically.

Figure 4:
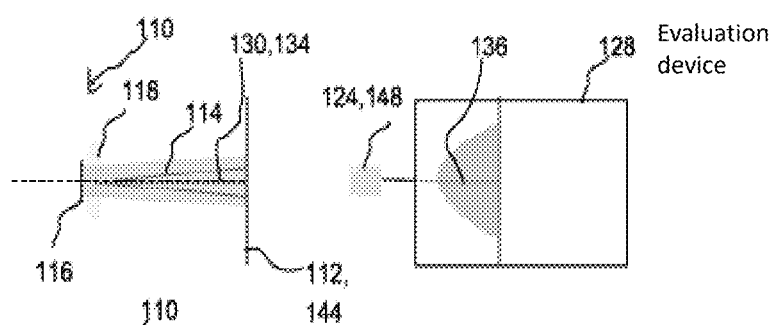
FIG. 4 shows a setup for step b) with the emitter array aligned within the setup.
Figure 5:
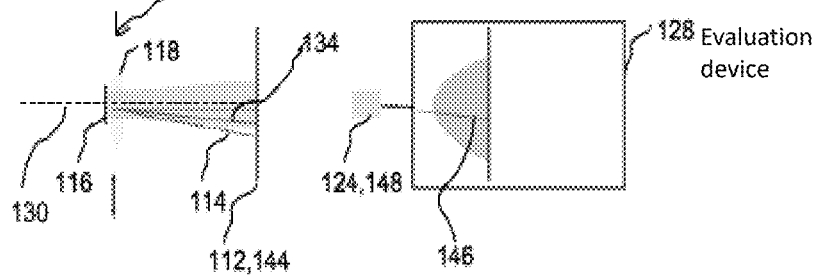
FIGS. 5 and 6 show misaligned setups of transfer device and array of emitters.

Now the center 136 of the illumination pattern 114, called the 0th-Order, is aligned to the marked center position of the big spot 122. An aligned center 136 and marked center position is shown in FIG. 4. Each of the emitters generates a light beam and the surface of the object 112 is illuminated with the light beams with the transfer device 118 between the array of emitters 116 and the object 112 thereby generating the illumination pattern 114 on the object 112. The camera 124, e.g. the at least one auxiliary camera 148 (as shown in FIG. 4) described with respect to step a) or the camera 146 of the detector, images the at least one image of the object 112 illuminated by the illumination pattern 114. The evaluation device 128 is configured for evaluating the image of the object 112 thereby determining the center 136 of the illumination pattern 114. The evaluation device 128 is configured for comparing the determined center 136 and the marked center position. In case a deviation of the center 136 and the marked center position exceeds at least one tolerance range the position of the center 136 is adapted to the marked center position by translating the array of emitters 116 in regard to the transfer device 118. The tolerance range may be ±10%, preferably ±5%, more preferably ±2%. A misaligned setup is shown in FIG. 5. The adapting of the position of the center 136 with regard to the transfer device 118 is indicated with arrows. In case the tolerance range is not exceeded, the position of the center 136 may be maintained.

Additionally or alternatively, the transfer device alignment step comprises step b2) 138. The combination of b1) 132 and b2) 138 may allow obtaining the best possible alignment. However, e.g. for time saving, the method may only comprise one of b1) 132 or b2) 138.

Figure 6:
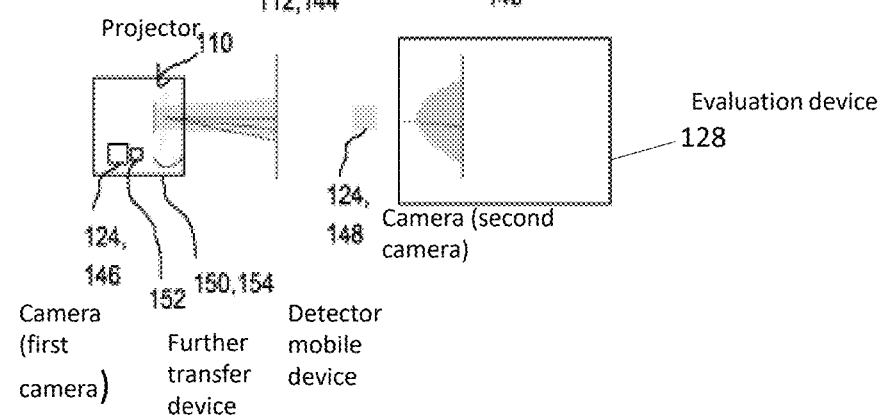

Step b2) is described with respect to FIGS. 6 and 7. Step b2) 138 may begin with arranging the transfer device 118 between the array of emitters 116 and the object 112. Step b2) 138 comprises generating a light beam by each of the emitters, illuminating the surface of the object 112 with the light beams with the transfer device 118 between the array of emitters 116 and the object 112 thereby generating the illumination pattern 114 on the object 112 and imaging at least one image of the object 112 illuminated by the illumination pattern 114 by using the camera 124, e.g. the at least one auxiliary camera 148 described with respect to step a) or the camera 146 of the detector 150 as shown in FIG. 6. FIG. 6 shows highly schematically the detector 150 and a mobile device 154 comprising the detector 150. The detector 150 comprises at least one further transfer device 152 configured for guiding the light beam onto the optical sensors and for forming the reflection image on the sensor element.

For example, the transfer device 118 in front of the array of emitters 116 may create a projection of the illumination pattern 114, e.g. a regular spot pattern, on the target screen 144. Misalignment of the corresponding axes, i.e. the transfer device 118 is shifted and/or tilted in front of the array of emitters 116, may lead to a deformed pattern 114. Therefore, the dots, and their respective positions to each other can be used to determine the alignment quality.

The method step b2) 138 comprises evaluating the image of the object 112. The evaluation device 128 may be configured for identifying illumination features on the image of the object 112 illuminated by the illumination pattern 114 and for determining their respective spot positions and/or grid positions. The evaluation may comprise determining the positions of the illumination features and their respective grid position in the image of the camera 124. The grid position may be a position of the illumination feature within the pattern 114. The evaluation device 128 may comprise software tools for determining the spot positions and their grid position, e.g. a software for spot detection and/or a software for matching the detected spot to the grid.

The positions of the illumination features and their respective grid position may be used to determine, in particular to calculate, a bounding box 140 for the illumination pattern 114. The bounding box 140 may be a limit distinguishing between inside and outside of the illumination pattern 114. The outside may be a surrounding. The bounding box 140 may be created with using some of the illumination features towards the edges of the pattern 114. The bounding box 140 may have a shape selected from the group consisting of rectangle, circle, triangle, and the like. A bounding box 140 with any known shape can be used, from which the deformation can be computed. The transfer device 118 may be properly aligned if the deformation is eliminated and/or minimized.

Step b2) 138 comprises comparing at least one property of the determined bounding box 140 to at least one pre-defined and/or pre-known property of a target bounding box 142. The property of the bounding box 140 may be related to at least one geometrical relation. The pre-defined and/or pre-known property of a target bounding box 142 may be stored in at least one database of the evaluation device 128. The target bounding box 142 may be a bounding box in case of proper alignment of the transfer device 118.

Figure 7A:
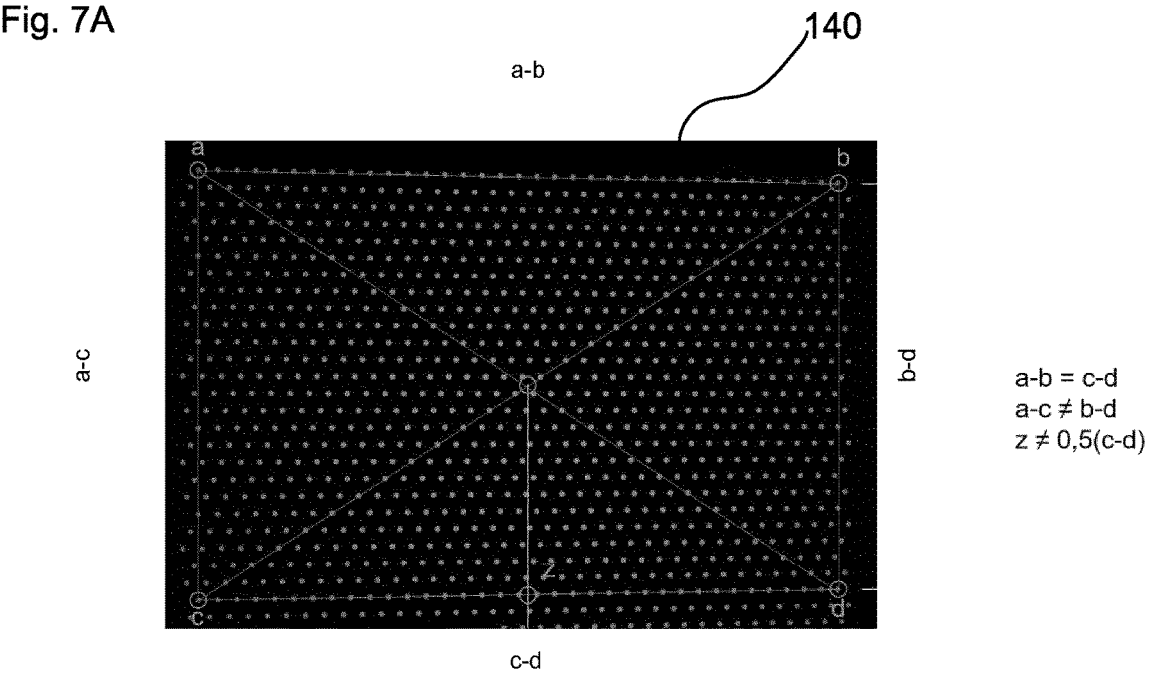
FIGS. 7A and 7B show a distorted illumination pattern and the illumination pattern in case of a proper alignment.

FIG. 6 depicts a case, in which the requirement for the alignment are not fulfilled. In this case, the transfer device 118 may be tilted with respect to the array of emitters 116, in particular with respect to the central axis 130, which also leads to a shifted 0th order. However, this can be compensated with shifting the transfer device 118, denoted with the arrow in FIG. 6. An example of the bounding box 140 for a misaligned case is shown in FIG. 7A and for a case of proper alignment, i.e. the corresponding target bounding box. For example a bounding rectangle can be drawn using four of the corner spots, as seen on FIGS. 7A and 7B. If the axes are well aligned, the bounding box 140 follows defined rules as follows:

opposite sides of the rectangle are equal;
a center coordinate of diagonals equals a half-point coordinate of the corresponding side.

Figure 7B:
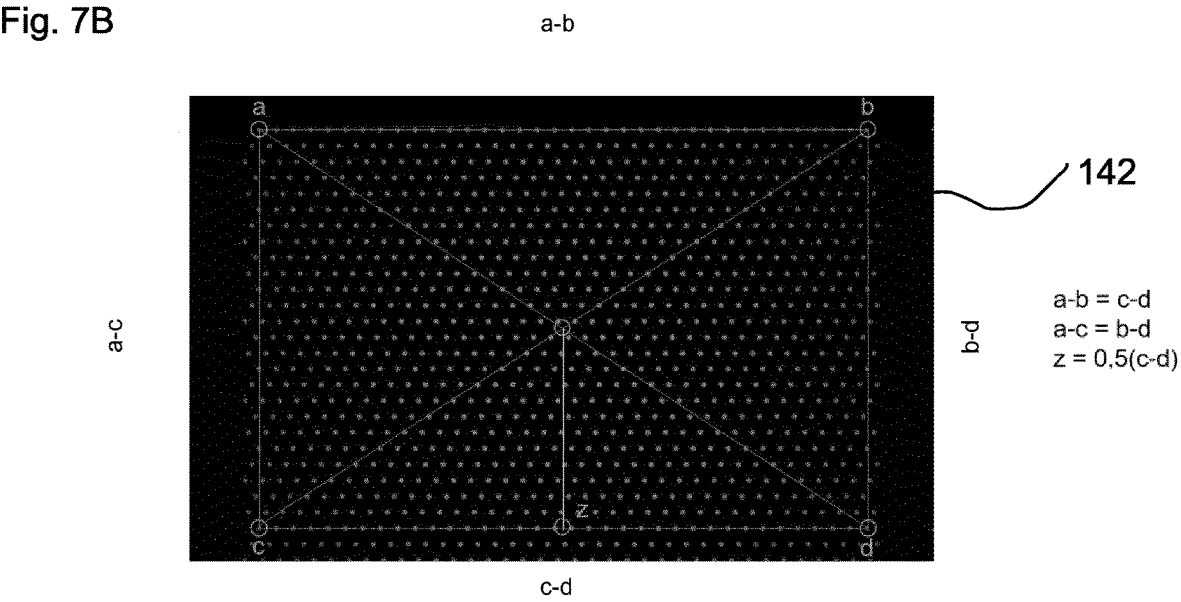

In case of FIG. 7B the following equations hold true: a−b=c−d, a−c=b−d, z=0.5 (c−d), with a, b, c and d being the positions of the four corner spots used for the bounding box and z, being the center of the rectangular bounding box. For FIG. 7A the last two conditions are not fulfilled.

The method step b2) 138 comprises adapting a position and/or orientation of the transfer device 118 in case a deviation of the property of the determined bounding box 140 and the pre-defined and/or pre-known property exceeds at least one tolerance range. The tolerance range may be ±10%, preferably ±5%, more preferably ±2%. In case the tolerance range is not exceeded, the position and/or orientation of the transfer device 118 may be maintained.

The method according to the present invention may allow reducing lower cost through higher projector yield and due to the possibility to make an active alignment of camera 124 to projector 110 during system production unnecessary. This is a significant time and money saver. In addition, higher performance and more robust calibration of our 3D sensing systems may be possible.

LIST OF REFERENCE NUMBERS 110 projector
112 object
114 illumination pattern
116 array of emitters
118 transfer device
120 Step a)
122 spot
124 camera
126 intensity distribution
128 evaluation device
130 central axis
132 Step b1)
134 optical axis
136 center
138 Step b2)
140 bounding box
142 target bounding box
144 target screen
146 first camera
148 second camera
150 detector
152 further transfer device
154 mobile device

The invention claimed is:

1. A method for alignment of optical components of a projector for illuminating at least one object with at least one illumination pattern comprising a plurality of illumination features, wherein the projector comprises at least one array of emitters, wherein each of the emitters is configured for generating at least one light beam, wherein the projector comprises at least one transfer device configured for generating the illumination features from the light beams impinging on the transfer device, wherein the method comprises the following steps:

a) at least one emitter array alignment step, comprising
generating a light beam by each of the emitters and illuminating a surface of the object with the light beams without the transfer device between the array of emitters and the object thereby generating a spot on the object,
imaging at least one image of the spot by using at least one camera,
determining at least one intensity distribution of the spot by evaluating the image of the spot and comparing the determined intensity distribution to at least one pre-defined and/or pre-known intensity distribution using at least one evaluation device,
and adapting an orientation of the array of emitters such that a central axis of the array of the emitters is perpendicular to the surface of the object in case a deviation of the determined intensity distribution and the pre-defined and/or pre-known intensity distribution exceeds at least one tolerance range;

b) at least one transfer device alignment step comprising
b1) marking a center position of the spot on the object,
arranging the transfer device between the array of emitters and the object such that an optical axis of the transfer device is perpendicular to the surface of the object,
generating a light beam by each of the emitters, illuminating the surface of the object with the light beams with the transfer device between the array of emitters and the object thereby generating the illumination pattern on the object,
imaging at least one image of the object illuminated by the illumination pattern by using the camera,
evaluating the image of the object thereby determining a center of the illumination pattern on the object using the evaluation device,
comparing the determined center and the marked center position,
adapting a position of the center to the marked center position by translating the array of emitters in regard to the transfer device in case a deviation of the center and the marked center position exceeds at least one tolerance range, and/or b2) arranging the transfer device between the array of emitters and the object, generating a light beam by each of the emitters, illuminating the surface of the object with the light beams with the transfer device between the array of emitters and the object thereby generating the illumination pattern on the object, imaging at least one image of the object illuminated by the illumination pattern by using the camera, evaluating the image of the object thereby determining a bounding box of the illumination pattern by using the evaluation device, comparing at least one property of the determined bounding box to at least one pre-defined and/or pre-known property of a target bounding box and adapting a position and/or orientation of the transfer device in case a deviation of the property of the determined bounding box and the pre-defined and/or pre-known property exceeds at least one tolerance range.

2. The method according to claim 1, wherein each of the emitters is and/or comprises at least one element selected from the group consisting of at least one laser source, at least one semi-conductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser (VCSEL); at least one non-laser light source, at least one LED, and at least one light bulb.

3. The method according to claim 1, wherein the camera comprises at least one CCD camera or at least one CMOS camera.

4. The method according to claim 1, wherein the transfer device comprises at least one imaging optical device.

5. The method according to claim 1, wherein the object is at least one target screen, wherein the object is at least one semi-transparent target screen, wherein the projector is arranged on one side of the target screen and the camera is arranged on an opposite side of the target screen, or wherein the object is a non-transparent target screen, wherein the projector and the camera are arranged on the same side of the target screen.

6. The method according to claim 1, wherein step a) comprises removing the transfer device from the projector.

7. The method according to claim 1, wherein the evaluation device is configured for identifying illumination features on the image of the object illuminated by the illumination pattern and for determining their respective spot positions and/or grid positions.

8. The method according to claim 1, wherein the property of the bounding box is related to at least one geometrical relation.

9. A detector for determining a position of at least one object, the detector comprising at least one projector for illuminating at least one object with at least one illumination pattern comprising a plurality of illumination features, wherein the projector comprises at least one array of emitters, wherein each of the emitters is configured for generating at least one light beam, wherein the projector comprises at least one transfer device configured for generating the illumination features from the light beams impinging on the transfer device;

at least one camera having at least one sensor element having a matrix of optical sensors, the optical sensors each having a light-sensitive area, wherein each optical sensor is designed to generate at least one sensor signal in response to an illumination of its respective light-sensitive area by a reflection light beam generated in response to the illumination by the illumination pattern and propagating from the object to the camera, wherein the camera is configured for imaging at least one reflection image comprising a plurality of reflection features generated by the object in response to illumination by the illumination features, wherein each of the reflection features comprises at least one beam profile; and at least one evaluation device configured for determining at least one longitudinal coordinate for each of the reflection features by analysis of its respective beam profile, wherein the detector is configured for performing the method for alignment of optical components of the projector according to claim 1.

10. The detector according to claim 2, wherein the detector comprises at least one auxiliary camera, wherein the projector is arranged on one side of the object and the auxiliary camera is arranged on an opposite side of the object.

11. The detector according to claim 9, wherein the evaluation device is configured for determining the longitudinal coordinate for each of the reflection features by using a depth-from-photon-ratio technique.

12. The detector according to claim 11, wherein the analysis of the beam profile comprises determining at least one first area and at least one second area of the beam profile, wherein the evaluation device is configured for deriving a combined signal Q by one or more of dividing the first area and the second area, dividing multiples of the first area and the second area, dividing linear combinations of the first area and the second area, wherein the evaluation device is configured for using at least one predetermined relationship between the combined signal Q and the longitudinal coordinate for determining the longitudinal coordinate.

13. The detector according to claim 9, wherein the detector comprises at least one further transfer device configured for guiding the light beam onto the optical sensors and for forming the reflection image on the sensor element.

14. A mobile device configured for determining a position of at least one object, wherein the mobile device comprises at least one detector according to claim 9, wherein the mobile device is one or more of a mobile communication device, a tablet computer, or a portable computer.

15. A method of using the detector according to claim 9, the method comprising using the detector for a purpose selected from the group consisting of a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application; a gait monitoring application; a human body monitoring application; home care; smart living; and an automotive application.

* * * * *